US006606938B2

(12) United States Patent
Taylor

(10) Patent No.: US 6,606,938 B2
(45) Date of Patent: Aug. 19, 2003

(54) TWO STEP PUNCTURING AND VENTING OF SINGLE SERVE FILTER CARTRIDGE IN A BEVERAGE BREWER

(75) Inventor: Jon Taylor, Groton, MA (US)

(73) Assignee: Keurig, Incorporated, Wakefield, MA (US)

(*) Notice: Subject to any disclaimer, the term of this patent is extended or adjusted under 35 U.S.C. 154(b) by 0 days.

(21) Appl. No.: 10/113,282

(22) Filed: Apr. 1, 2002

(65) Prior Publication Data

US 2002/0144603 A1 Oct. 10, 2002

Related U.S. Application Data

(60) Provisional application No. 60/281,952, filed on Apr. 6, 2001.

(51) Int. Cl.⁷ .............................. A47J 31/32; A23F 5/00
(52) U.S. Cl. ........................ 99/295; 99/302 R; 426/433; 426/77
(58) Field of Search .............................. 99/295, 302 R, 99/275; 426/433, 435, 77

(56) References Cited

U.S. PATENT DOCUMENTS

| 5,472,719 | A | * | 12/1995 | Favre | 426/77 |
| 5,773,067 | A | * | 6/1998 | Freychet et al. | 99/295 X |
| 5,840,189 | A | | 11/1998 | Sylvan et al. | |
| 6,142,063 | A | | 11/2000 | Beaulieu et al. | |

* cited by examiner

*Primary Examiner*—Reginald L. Alexander
(74) *Attorney, Agent, or Firm*—Samuels, Gauthier & Stevens

(57) ABSTRACT

In a method and apparatus for brewing a beverage from a dry beverage medium contained in a disposable cartridge, the cartridge is initially pierced and vented by a tubular outlet probe, and then pierced by a tubular inlet probe. Heated liquid is admitted to the cartridge interior via the inlet probe for combination with the beverage medium to produce a beverage, and the beverage is extracted from the cartridge via the outlet probe.

8 Claims, 5 Drawing Sheets

TWO STEP PUNCTURING AND VENTING OF SINGLE SERVE FILTER CARTRIDGE IN A BEVERAGE BREWER

CROSS REFERENCE TO RELATED APPLICATION

This application claims priority of provisional patent application Serial No. 60/281,952 filed Apr. 6, 2001.

BACKGROUND DISCUSSION

1. Field of the Invention

This invention relates generally to beverage brewers, and is concerned in particular with an improved system for puncturing and venting single serve beverage filter cartridges utilized in the brew cycles of such brewers.

2. Description of the Prior Art

It is known, as disclosed for example in U.S. Pat. Nos. 5,325,765 (Sylvan et al.) and U.S. Pat. Nos. 5,840,189 (Sylvan et al.) to employ sharpened tubular inlet and outlet probes to puncture the lid and base of a single serve beverage filter cartridge. The inlet probe admits heated liquid into the cartridge for combination with a beverage medium to produce a beverage which then exits the cartridge via the outlet probe. While this arrangement operates in a generally satisfactory manner, experience has indicated that the cartridge interiors occasionally become pressurized as a result of altitude or temperature changes and/or outgassing of the beverage medium. If internal pressures are relieved by venting through the inlet probe, particles of the beverage medium may be entrained with the exiting gas, causing clogging of the inlet probe and a malfunction of the brewer.

SUMMARY OF THE INVENTION

The objective of the present invention is to avoid or at least significantly minimize this problem by first puncturing the cartridge with the outlet probe, followed sequentially with a second puncturing by the inlet probe. In this manner, the cartridge is initially vented through the outlet probe, which then will be flushed clean by the exiting beverage flow.

These and other features and objectives of the present invention will now be described in greater detail with reference to the accompanying drawings, wherein:

DETAILED DESCRIPTION OF PREFERRED EMBODIMENT

Figure 1:
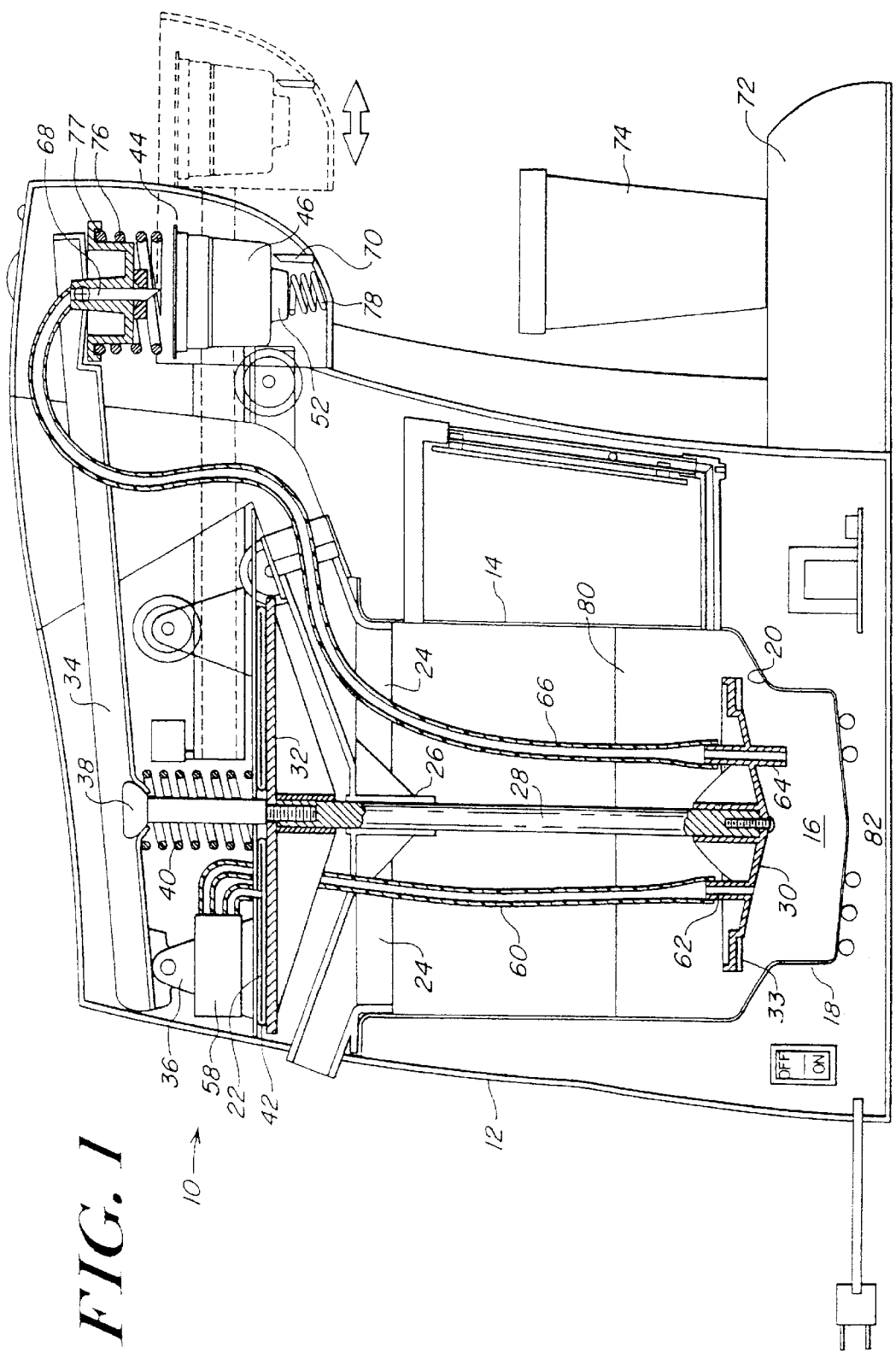
FIG. 1 is a vertical sectional view taken through a single serve brewer having a liquid dispensing system embodying the concepts of the present invention, with the dispensing system shown in a "ready" state prior to commencement of a brew cycle.
Figure 2:
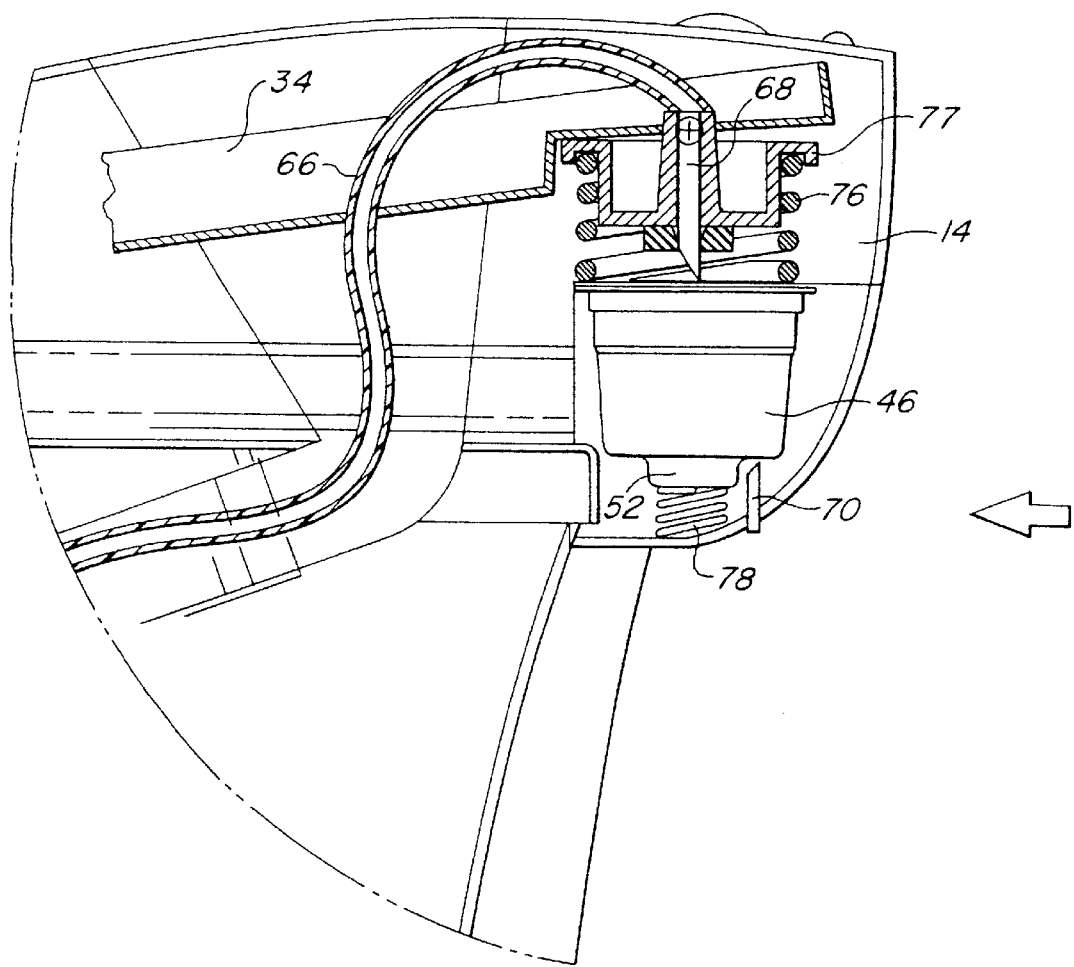
FIGS. 2–4 are views of the brewing chamber showing successive steps in the brew cycle, including the sequential puncturing sequence of the present invention.

With reference initially to FIG. 1, a single serve brewer 10 includes a housing 12 containing a liquid storage tank 14. The tank has a lower metering chamber 16 formed by a reduced diameter cup-shaped bottom 18 integrally joined to the larger diameter tank side wall at a circular sealing surface defining a seat 20.

A fixed internal structure includes a horizontal platform 22 and struts 24 supporting a vertically disposed sleeve bearing 26 aligned centrally with respect to the tank 14 and its cup-shaped bottom 18.

A vertically reciprocal shaft 28 extends through the sleeve bearing 26. The shaft carries a generally conically shaped baffle 30 at its lower end, and a circular plate 32 disposed beneath the platform 22. A resilient and compressible circular gasket 33 on the lower surface of the baffle overlies the seat 20.

An arm 34 is pivotally mounted on a bracket 36 carried by the platform 22. Arm 34 is connected to the shaft 28 by a pin 38. A coiled spring 40 surrounds the pin 38 between the arm 34 and the upper surface of platform 22, and an inflatable bladder 42 is positioned between the bottom surface of the platform 22 and the plate 32.

The distal end of arm 34 extends into a brewing chamber 44 designed to accept a single serve beverage filter cartridge 46 of the type described in copending patent application Ser. No. 09/782,622 filed Feb. 13, 2001, the description of which is herein incorporated by reference in its entirety.

An air pump 58 on platform 22 is connected to the bladder 42, and is also connected via a flexible hose 60 to a port 62 in the baffle 30. A metering tube 64 extends through the baffle 30 into the chamber 16. The metering tube 64 is connected via a second flexible hose 66 to a depending tubular inlet probe 68 carried by the arm 34. A second tubular outlet probe 70 underlies the cartridge 46 and opens downwardly above an exterior shelf 72 configured and dimensioned to support a cup 74 or other like receptacle.

Figure 5:
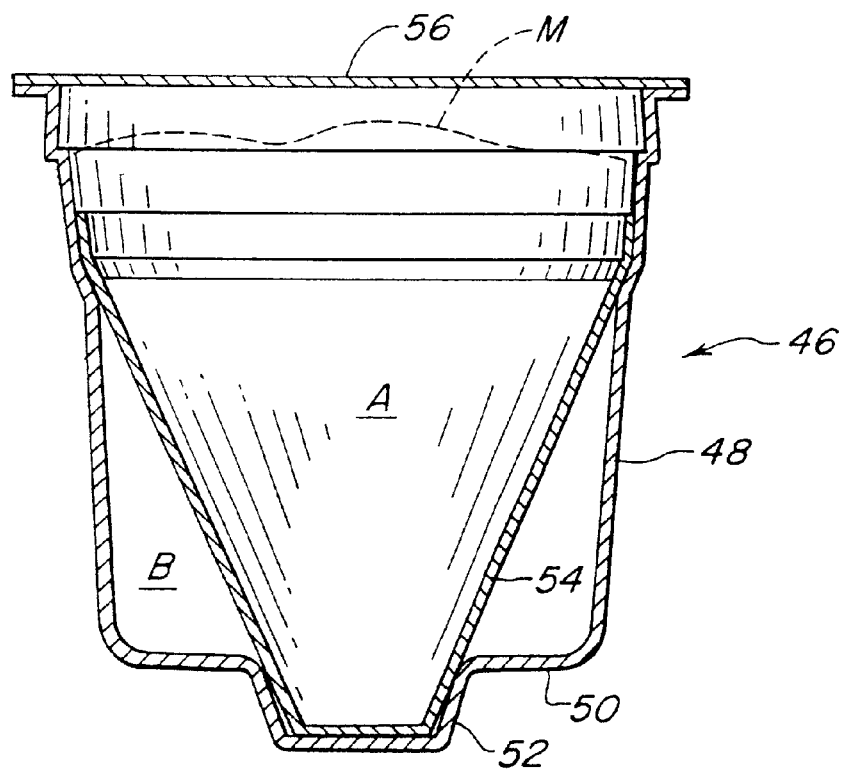
FIG. 5 is a vertical sectional view through a single serve beverage filter cartridge of the type used with the brewer shown in FIG. 1.

As shown in FIG. 5, the beverage filter cartridge 46 includes a cup-shaped container 48 having a bottom 50 configured with a depending reduced diameter well 52. The interior of the container is subdivided by a cone-shaped permeable filter 54 into first and second chambers A, B. The bottom of the filter is received in and fixed to the bottom of the well 52. A dry beverage medium "M", typically ground roasted coffee, is stored in the chamber A, after which oxygen is purged from the container interior by the introduction of an inert gas, typically nitrogen. The top of the container is then closed by a lid 56. Both the container and the lid are formed of impermeable yieldably piercable materials.

When the cartridge 46 is located in the brewing chamber 44, inlet probe 68 is above and aligned with chamber A, and outlet probe 70 is offset from well 52 and aligned beneath chamber B. A helical spring 76 surrounds the inlet probe 68. Spring 76 underlies a platen 77 carried on the distal end of arm 34. A second helical spring 78 underlies the depending cartridge well 52. Spring 78 has a resistance to compression that is lower than that of spring 76.

The tank 14 stores a supply of water 80 heated by an electrical heating element 82 underlying the cup-shaped bottom 18.

Figure 3:
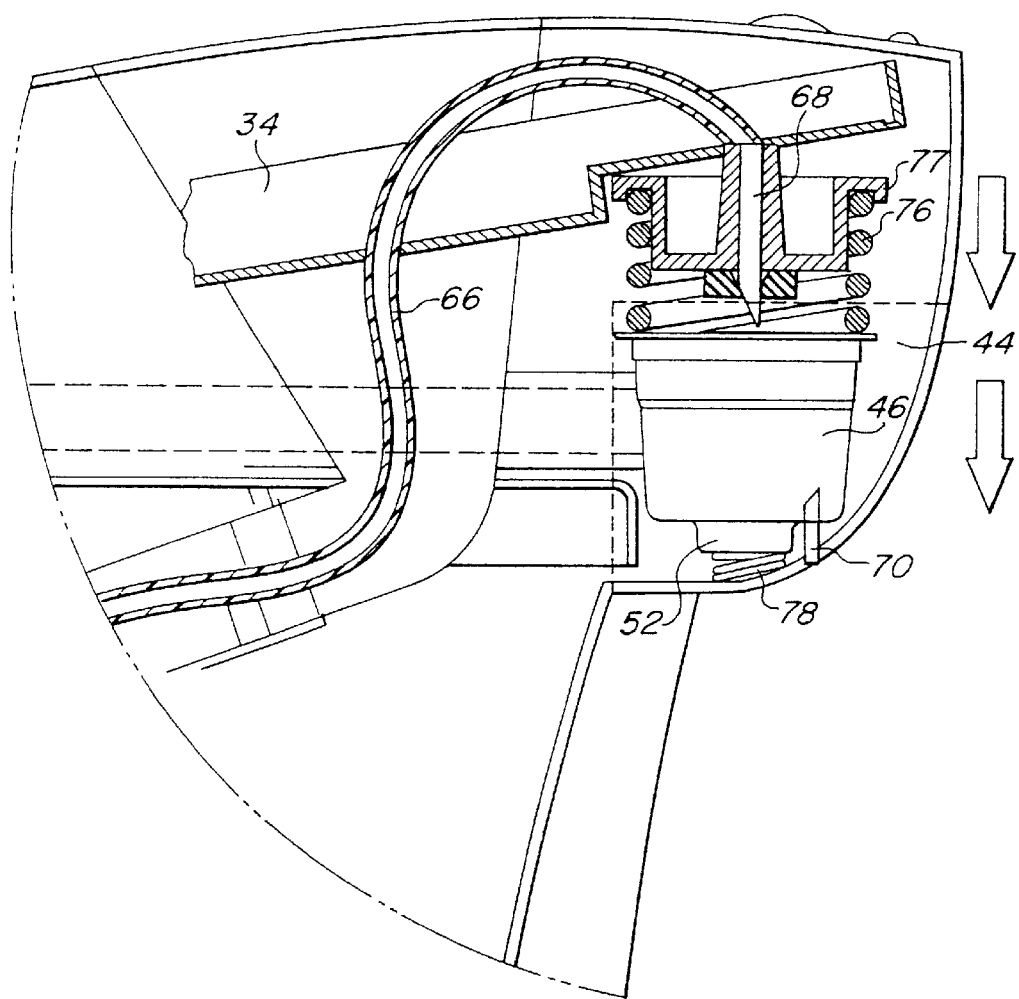
Figure 4:
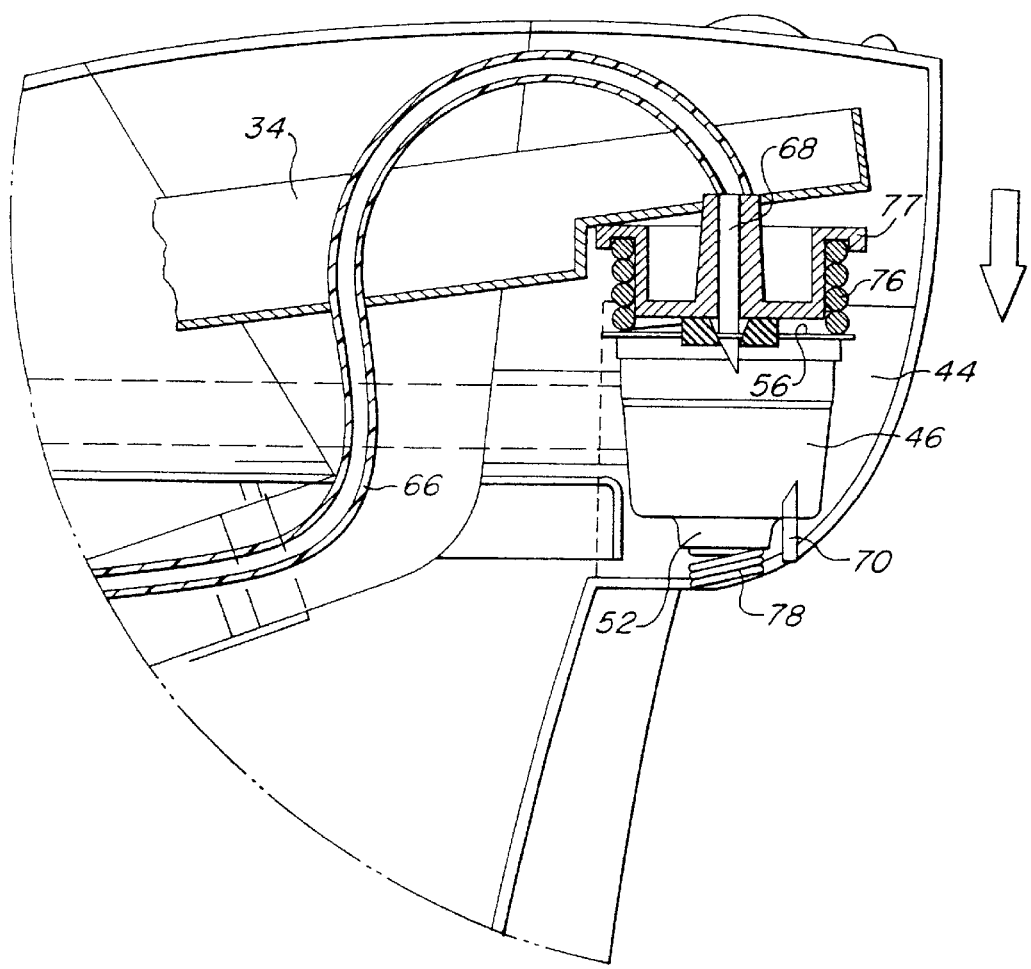

During a brew cycle, a control system including appropriate valves and circuitry (not shown) operates the air pump 58 to pneumatically effect the following sequence:

a) The bladder 42 is inflated, pushing shaft 28 and baffle 30 downwardly, until the gasket 33 is pressed against the seat 20 to seal off the water in the metering chamber 16 from the remainder of the tank 14. Downward movement of the shaft 28 also produces downward pivotal movement of arm 34 against the resistance of the spring 40.

b) As shown in FIG. 3, during the initial stage of downward pivotal movement of arm 34, platen 77, spring 76 and probe 68 move downwardly in concert. Spring 76 resists compression, while spring 78 becomes compressed. The cartridge 46 is thus pressed downwardly, causing the cartridge bottom 50 to be pierced by the underlying exit probe 70. The interior of the cartridge is thus vented via probe 70, resulting in its internal pressure being equalized to that the surrounding atmosphere.

c) As shown in FIG. 4, during the final stage of downward pivotal movement of arm 34, spring 76 is axially compressed between the platen 77 and the container lid 56, resulting in the lid being pierced by probe 68. The probes 68, 70 are now in communication, respectively, with chambers A and B of the cartridge 46.

d) Compressed air is then fed into the metering chamber 16 via hose 60, causing a metered amount of heated water to be expelled and fed to the cartridge 46 via hose 66 and the tubular probe 68. The heated water infuses the beverage medium M in chamber A to produce a brewed beverage. The beverage passes through the filter 54 into chamber B, from which it exits via probe 70 and is received in the underlying cup 74.

e) At the conclusion of the brewing cycle, the pump 56 is deactivated and the system is vented and returned to the condition shown in FIG. 1. The bladder 42 is collapsed, allowing an upward displacement of the shaft 28 and arm 34 under the combined return force of springs 40, 76 and 78. The baffle 30 is thus raised above the seat 20, allowing air in the chamber 16 to be displaced by water in the tank 14. Upward pivotal movement of arm 34 results in extraction of probe 68 and expansion of spring 78 raises the cartridge to it original position, resulting in extraction of the exit probe 70. The spent cartridge 46 may then be removed from the brew chamber 44, readying the system for the next cycle.

Various modifications may be made to the embodiment herein disclosed. For example, in certain circumstances, it may be desirable to omit the second spring 78, in which case the cartridge will remain impaled on and will require manual removal from the exit probe 70 at the conclusion of the brew cycle. The force required to compress spring 76 will be selected to insure that the cartridge is initially pierced by and safely vented through exit probe 70. Another modification might entail fixing the inlet probe 68 and spring 76, and vertically shifting the exit probe 70 and spring 78 to elevate rather than lower the cartridge, resulting in the cartridge again being initially pierced by the exit probe, followed by piercing of the lid by the inlet probe.

Still another modification might be to fix the cartridge in place, and independently operate the probes to effect the desired sequential piercing by the exit and inlet probes. Also, instead of a single air pump 58, two pumps might be employed, one to inflate the bladder 42 and the other to pressurize the metering chamber 16.

It is my intention to cover these and any other changes or modifications that do not depart from the spirit and scope of the invention encompassed by the claims appended hereto.

I claim:

1. In a single serve beverage brewer wherein a beverage medium is contained in a disposable cartridge having a yieldably piercable lid and base, and wherein the cartridge lid is pierced by a tubular inlet probe through which heated liquid is admitted into the cartridge interior for combination with the beverage medium to produce a beverage, and the cartridge base is pierced by a tubular outlet probe through which the beverage is extracted from the cartridge, the improvement comprising:

a brewing chamber structured and dimensioned to removably retain said cartridge between and spaced from both said inlet and outlet probes;

a platen carrying said inlet probe;

means for shifting said platen between a raised position at which said inlet probe is spaced from the cartridge lid, and a lowered position at which said inlet probe has pierced said lid, and resilient means responsive to movement of said platen from said raised position to said lowered position for urging said cartridge towards said outlet probe to effect piercing of the cartridge base by said outlet probe prior to the cartridge lid being pierced by said inlet probe.

2. The single serve beverage brewer of claim 1 wherein said resilient means is carried by said platen and arranged to contact the cartridge lid.

3. The single serve beverage brewer of claims 1 or 2 wherein said resilient means comprises a coiled spring surrounding said inlet probe.

4. The single serve beverage brewer of claim 3 wherein further comprising a second spring positioned to yieldably resist movement of said cartridge towards said outlet probe.

5. The single serve beverage brewer of claim 4 wherein said second spring has a resistance to compression that is lower than the resistance to compression of said first mentioned spring.

6. A method of brewing a beverage from a beverage medium contained in a disposable cartridge, comprising the following steps, in sequence:

(a) piercing the cartridge with a tubular outlet probe to vent the cartridge interior;

(b) piercing the cartridge with a tubular inlet probe;

(c) admitting heated liquid into the cartridge interior via the inlet probe for combination with the beverage medium to produce a beverage; and (d) extracting the beverage from the cartridge interior via the outlet probe.

7. The method of claim 6 wherein step (a) is achieved by resiliently urging the cartridge against the outlet probe.

8. The method of claim 7 wherein the cartridge is resiliently urged against the outlet probe in response to movement of the inlet probe towards the cartridge.

* * * * *